US009512915B2

(12) United States Patent
Ito

(10) Patent No.: US 9,512,915 B2
(45) Date of Patent: Dec. 6, 2016

(54) OIL RESERVOIR STRUCTURE OF TRANSMISSION

(71) Applicant: HONDA MOTOR CO., LTD., Tokyo (JP)

(72) Inventor: Yukari Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 14/519,467

(22) Filed: Oct. 21, 2014

(65) Prior Publication Data
US 2015/0122582 A1 May 7, 2015

(30) Foreign Application Priority Data

Nov. 7, 2013 (JP) ................................. 2013-231449

(51) Int. Cl.
*F16H 57/04* (2010.01)
(52) U.S. Cl.
CPC ...... *F16H 57/0408* (2013.01); *F16H 57/0483* (2013.01)
(58) Field of Classification Search
CPC ........................ F16H 57/0408; F16H 57/0483
USPC ....................................................... 184/6.12
See application file for complete search history.

(56) References Cited

U.S. PATENT DOCUMENTS

| 2,480,486 | A | * | 8/1949 | Leazer | ................. | B01D 35/027 |
| | | | | | | 184/106 |
| 3,625,310 | A | * | 12/1971 | Herrick | ............... | F16H 57/0447 |
| | | | | | | 184/13.1 |
| 3,734,149 | A | * | 5/1973 | Hansel | .................... | F16K 21/00 |
| | | | | | | 141/285 |
| 3,949,720 | A | * | 4/1976 | Zipprich | .......... | B60K 15/03504 |
| | | | | | | 123/518 |

(Continued)

FOREIGN PATENT DOCUMENTS

| CN | 1824975 A | 8/2006 |
| CN | 1966941 | 5/2007 |

(Continued)

OTHER PUBLICATIONS

Office Action dated Jul. 21, 2016, issued in counterpart Chinese Application No. 201410588517.7. (5 pages).

(Continued)

*Primary Examiner* — Michael Riegelman
(74) *Attorney, Agent, or Firm* — Westerman, Hattori, Daniels & Adrian, LLP

(57) ABSTRACT

An inclined surface inclined such that a portion thereof farther away from an oil injection port becomes lower is formed in an inner wall of an oil reservoir which faces a tip end of an oil injection gun to be inserted into the injection port, such that oil to be discharged by the injection gun is guided by the inclined surface toward a bottom portion of the reservoir. Accordingly, the oil to be discharged by the injection gun is prevented from splashing back from the inner wall of the reservoir, which faces the tip end of the (Continued)

injection gun, and blowing back out from the injection port in a simple structure, and smooth oil injection work is thereby enabled. Additionally, it is possible to prevent a situation where a worker erroneously recognizes that the injection work of the oil is completed, and an amount of the injected oil is insufficient.

4 Claims, 5 Drawing Sheets

(56) References Cited

U.S. PATENT DOCUMENTS

| | | | | |
|---|---|---|---|---|
| 4,331,185 | A * | 5/1982 | Rinaldo | F16H 57/0408 141/285 |
| 4,657,156 | A * | 4/1987 | Uranishi | B60K 15/04 137/582 |
| 4,825,825 | A * | 5/1989 | Chino | F01M 11/0004 123/195 C |
| 4,986,235 | A * | 1/1991 | Ishii | F01M 11/0004 123/195 C |
| 5,103,782 | A * | 4/1992 | Matsui | F01M 11/0004 123/195 C |
| 5,158,152 | A | 10/1992 | Nemoto et al. | |
| 5,360,040 | A * | 11/1994 | Thorn | B60K 15/04 141/286 |
| 5,361,870 | A * | 11/1994 | Courcy | F01M 11/0458 184/1.5 |
| 5,819,796 | A * | 10/1998 | Kunimitsu | B60K 15/04 123/519 |
| 6,330,893 | B1 * | 12/2001 | O'Connell | B60K 15/04 141/286 |
| 6,584,950 | B1 * | 7/2003 | Cunningham | F01M 11/0004 123/195 C |
| 6,640,767 | B2 * | 11/2003 | Kato | F01M 5/02 123/195 C |
| 7,171,937 | B2 * | 2/2007 | Hada | F01M 11/0004 123/195 C |
| 7,387,190 | B2 * | 6/2008 | Lochocki, Jr. | F16H 57/0452 184/1.5 |
| 8,201,596 | B2 * | 6/2012 | Reddy | B60K 15/04 141/374 |
| 2006/0065487 | A1 * | 3/2006 | Tominaga | F16H 57/0406 184/6.12 |
| 2006/0130801 | A1 * | 6/2006 | Suzuki | F01M 11/045 123/196 R |
| 2009/0145695 | A1 * | 6/2009 | Hiramatsu | F01M 11/0004 184/106 |
| 2011/0073062 | A1 * | 3/2011 | Nakashima | F01M 11/0004 123/195 C |

FOREIGN PATENT DOCUMENTS

| | | |
|---|---|---|
| CN | 101415914 A | 4/2009 |
| CN | 201751546 U | 2/2011 |
| JP | 03-117150 U | 12/1991 |
| JP | 04-42955 A | 4/1992 |
| JP | 1128940 A | 2/1999 |
| JP | 2010-210019 A | 9/2010 |

OTHER PUBLICATIONS

Office Action dated Sep. 14, 2016, issued in counterpart Japanese Application No. 2013-231449, with English translation. (6 pages).

* cited by examiner

OIL RESERVOIR STRUCTURE OF TRANSMISSION

BACKGROUND OF THE INVENTION

Field of the Invention

The present invention relates to an oil reservoir structure of a transmission in which an oil injection port for inserting an oil injection gun, which is used to inject oil into an oil reservoir, is provided in a side wall located above the oil reservoir formed in a bottom portion of a transmission.

Description of the Related Art

A following structure is publicly known from Japanese Patent Application Laid-open No. 2010-210019. An oil pan is fixed to a bottom portion of a transmission case of a transmission by multiple bolts, and a bolt hole to which one of the multiple bolts is screwed communicates with inside and outside of the transmission case to be used as a drain hole from which excessive oil injected into the oil pan overflows.

SUMMARY OF THE INVENTION

Meanwhile, in a case of injecting oil by inserting an oil injection gun into an oil injection port provided in a side wall of the transmission case, if an inner wall of an oil reservoir or a power transmission member of the transmission faces a tip end of the oil injection gun to be inserted into the oil injection port, the oil to be discharged by the oil injection gun may splash back to return and blow back out from the oil injection port. If such blowing-back of the oil occurs, workability in injection work of the oil greatly deteriorates. In addition, checking of an amount of the injected oil becomes difficult, and there may be a case where the worker erroneously recognizes that the injection work of the oil is completed, and the amount of the injected oil is insufficient.

The present invention has been made in view of the circumstances described above and an object thereof is to surely prevent oil to be discharged by an oil injection gun, which is used to inject the oil into an oil reservoir of a transmission, from blowing back out from an oil injection port in a simple structure.

In order to achieve the object, according to a first aspect of the present invention, there is provided an oil reservoir structure of a transmission in which an oil injection port for inserting an oil injection gun, which is used to inject oil into an oil reservoir, is provided in a side wall located above the oil reservoir formed in a bottom portion of a transmission, wherein an inclined surface inclined such that a portion of the inclined surface farther away from the oil injection port becomes lower is formed in an inner wall of the oil reservoir which faces a tip end of the oil injection gun to be inserted into the oil injection port, such that the oil to be discharged by the oil injection gun is guided by the inclined surface toward a bottom portion of the oil reservoir.

According to the configuration of the first aspect, the oil reservoir of the transmission has the oil injection port for inserting the oil injection gun, which is used to inject oil into the oil reservoir, in the side wall located above the oil reservoir formed in the bottom portion of the transmission. The inclined surface inclined such that the portion thereof farther away from the oil injection port becomes lower is formed in the inner wall of the oil reservoir which faces the tip end of the oil injection gun to be inserted into the oil injection port, such that the oil to be discharged by the oil injection gun is guided by the inclined surface toward the bottom portion of the oil reservoir. Accordingly, the oil to be discharged by the oil injection gun is prevented from splashing back from the inner wall of the oil reservoir, which faces the tip end of the oil injection gun, and blowing back out from the oil injection port in a simple structure, and smooth oil injection work is thereby made possible. In addition, it is possible to prevent a situation where a worker erroneously recognizes that the injection work of the oil is completed, and an amount of the injected oil is insufficient.

According to a second aspect of the present invention, in addition to the first aspect, a protruding portion protruding in an insertion direction of the oil injection gun is formed in the side wall below the oil injection port.

According to the configuration of the second aspect, the protruding portion protruding in the insertion direction of the oil injection gun is formed in the side wall below the oil injection port. Accordingly, even if the oil to be discharged from the oil injection gun and guided obliquely downward by the inclined surface circulates inside the oil reservoir and flows upward along the side wall, the protruding portion blocks this upward flow, and the blowing-back of the oil from the oil injection port can be thereby more surely prevented.

According to a third aspect of the present invention, in addition to the first or second aspect, an oil pump is disposed at a position which is farther away from the oil injection port than the inner wall, and at least part of the oil pump is immersed in the oil stored in the oil reservoir.

According to the configuration of the third aspect, the oil pump is disposed at a position which is farther away from the oil injection port than the inner wall, and at least part of the oil pump is immersed in the oil stored in the oil reservoir. Accordingly, the oil guided obliquely downward by the inclined surface of the inner wall is guided further downward by the oil pump to be directed toward the bottom portion of the oil reservoir, and this can more surely prevent the blowing-back of the oil from the oil injection port. In addition, the oil pump can exert a function of a baffle plate and suppress fluctuation in an oil level.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is described below based on FIGS. 1 to 5.

Figure 1:
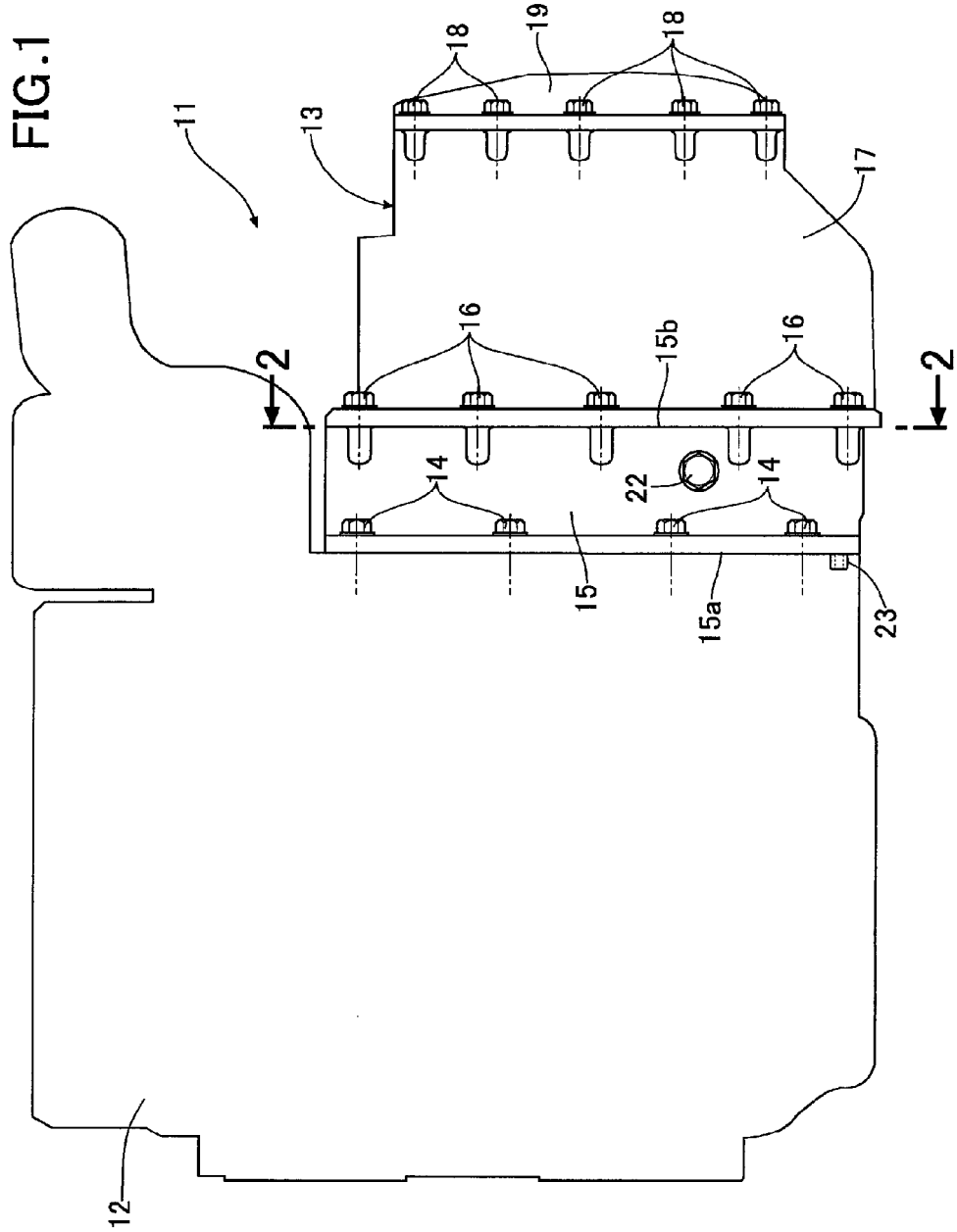
FIG. 1 is an elevation view of a power unit formed by coupling an engine and a transmission.

As shown in FIG. 1, a power unit 11 of an automobile includes an engine 12 and a transmission 13 which are integrally coupled to each other. The transmission 13 includes a torque converter case 15 having a first divided surface 15a joined to the engine 12 by bolts 14, a transmission case 17 joined to a second divided surface 15b of the torque converter case 15 by bolts 16, and a side cover 19 joined to the transmission case 17 by bolts 18.

Figure 2:
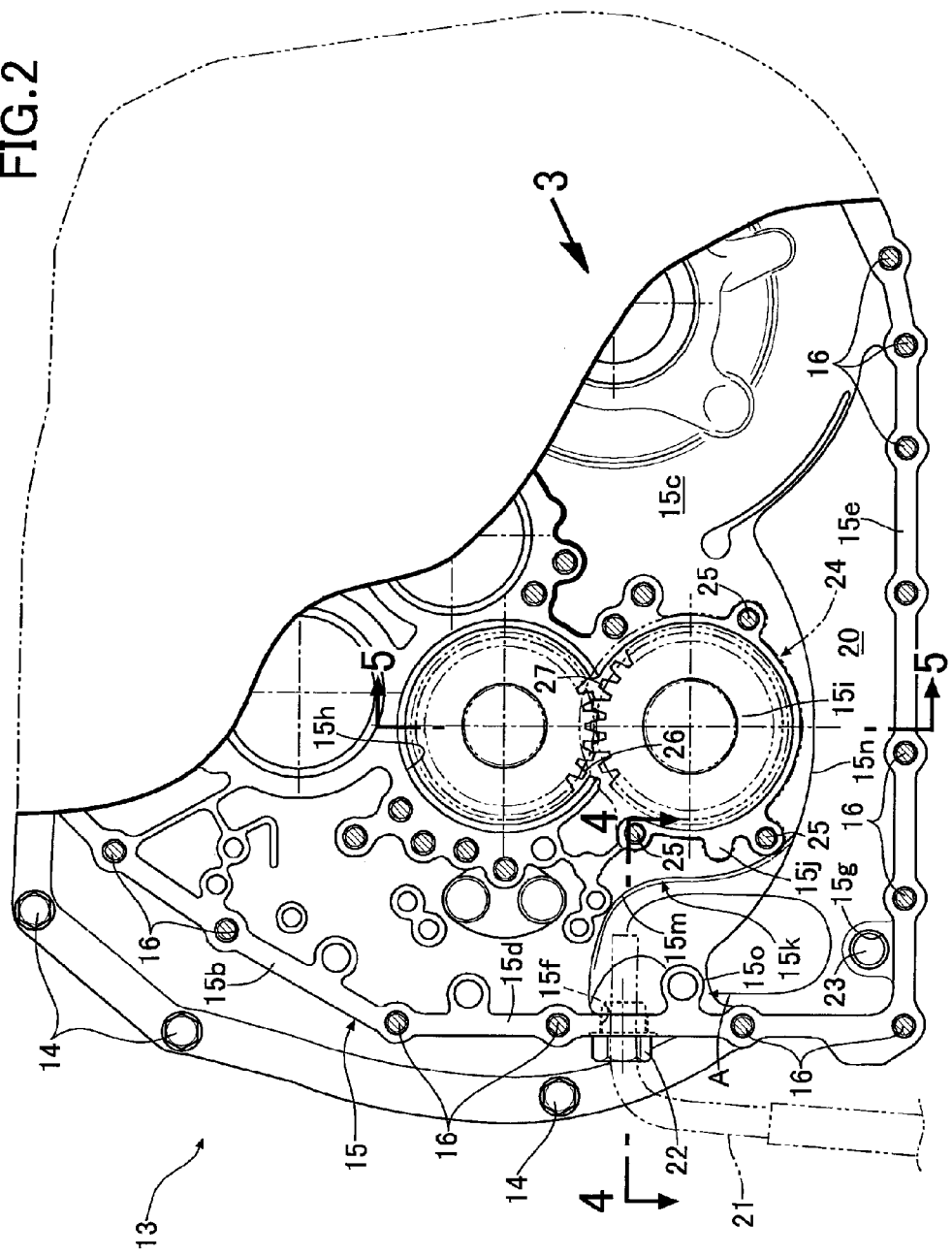
FIG. 2 is a view seen from arrow directions of a line 2-2 in FIG. 1.
Figure 3:
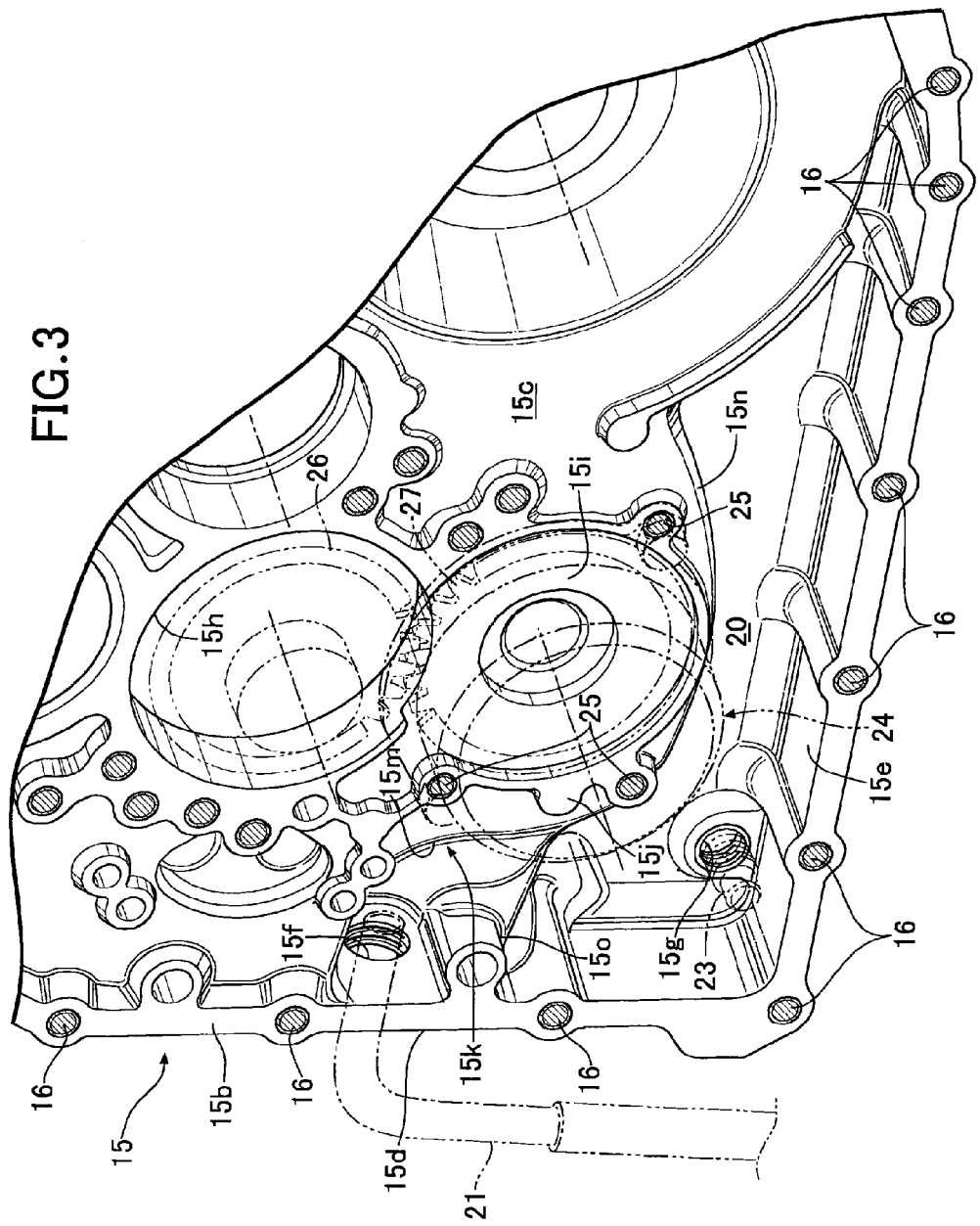
FIG. 3 is a view taken in a direction of an arrow 3 in FIG. 2.
Figure 4:
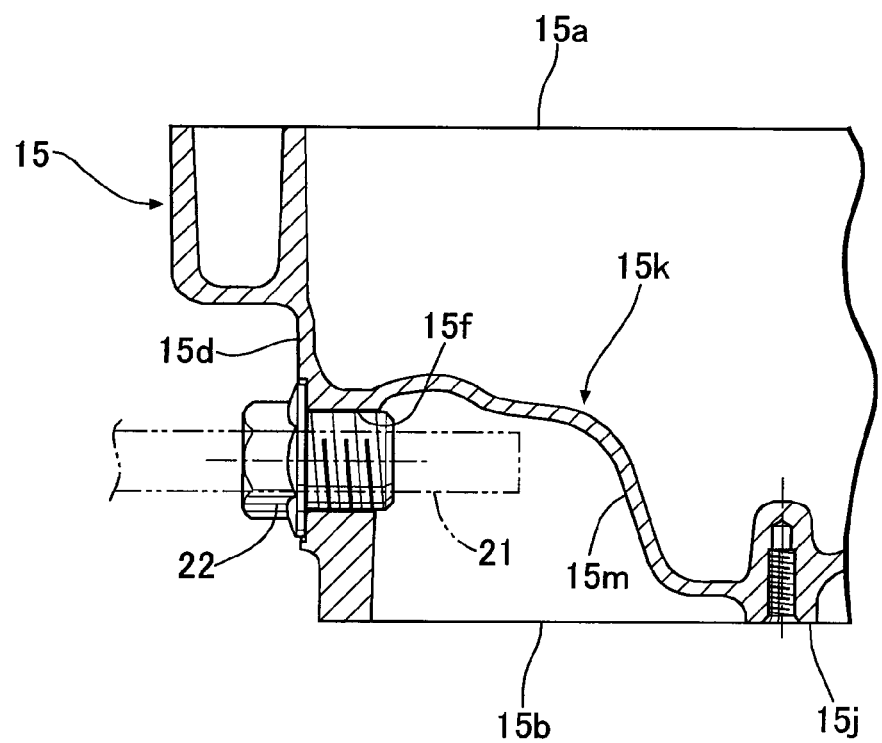
FIG. 4 is a sectional view taken along a line 4-4 in FIG. 2.
Figure 5:
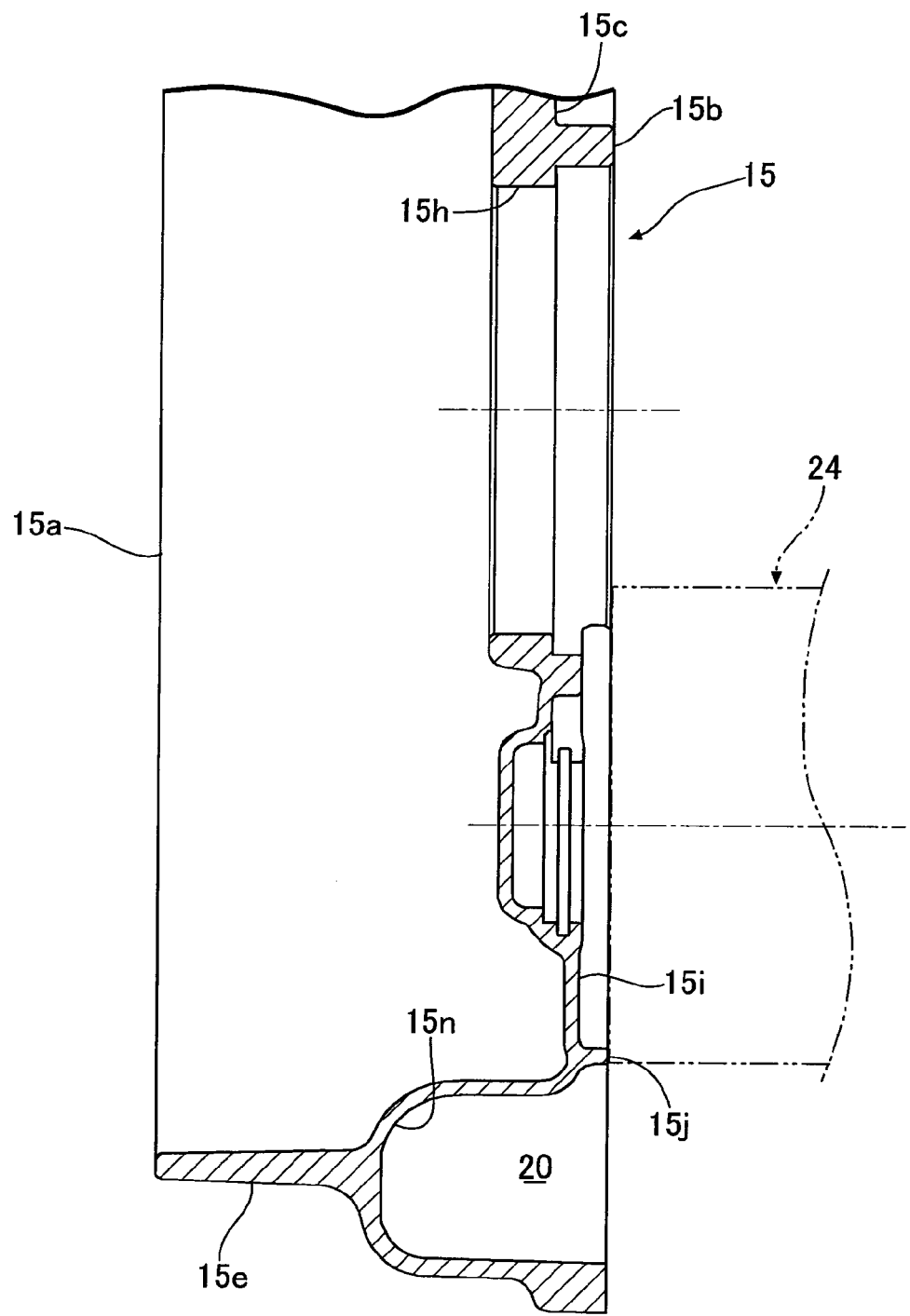
FIG. 5 is a sectional view taken along a line 5-5 in FIG. 2.

FIGS. 2 and 3 are views in which the torque converter case 15 is viewed from the transmission case 17 side, and a not-illustrated torque converter is disposed behind (on the engine 12 side of) a partition wall 15c of the torque converter case 15. In the torque converter case 15, a side wall 15d and a bottom wall 15e are connected to a periphery of the partition wall 15c, and end portions of the side wall 15d and the bottom wall 15e are connected to the second divided surface 15b.

An oil reservoir 20 to store oil is formed in a bottom portion of the torque converter case 15. An oil injection port 15f for inserting an oil injection gun 21 used to inject oil into the oil reservoir 20 is opened laterally in the side wall 15d. The oil injection port 15f is closed by an attachable and detachable bolt 22 (see FIGS. 1 and 4). Moreover, a drain hole 15g closed by an attachable and detachable bolt 23 (see FIGS. 1 and 3) is formed in a lower portion of the partition wall 15c of the torque converter case 15 which faces a bottom portion of the oil reservoir 20.

An input shaft supporting hole 15h for supporting a not-illustrated input shaft connected to an output side of the torque converter penetrates the partition wall 15c of the torque converter case 15 in an axial direction. A recess portion 15i for attaching a substantially-cylindrical oil pump 24 is formed directly below the input shaft supporting hole 15h. An oil pump attachment seat 15j is formed to surround a periphery of the recess portion 15i, and an outer peripheral portion of the oil pump 24 is fastened to the oil pump attachment seat 15j by three bolts 25.

An inner wall 15k (see FIGS. 2 to 4) which is the highest wall portion in the oil reservoir 20 extends from the side wall 15d directly above the oil injection port 15f toward the oil pump attachment seat 15j. An inclined surface 15m (see FIGS. 2 and 4) inclined downward away from the oil injection port 15f is formed in the inner wall 15k. Moreover, a recess portion 15n (see FIGS. 2, 3, and 5) greatly depressed toward the engine 12 is formed below the oil pump attachment seat 15j. Furthermore, a protruding portion 150 (see FIGS. 2 and 3) in which an oil passage is formed protrudes from the side wall 15d directly below the oil injection port 15f toward the oil pump attachment seat 15j.

Meshing an oil pump drive gear 26 and an oil pump driven gear 27 with each other causes the input shaft to drive the oil pump 24, the oil pump drive gear 26 provided on the input shaft fitted to the input shaft supporting hole 15h, the oil pump driven gear 27 provided on a pump shaft of the oil pump 24. An outer periphery of the oil pump driven gear 27 is surrounded by the oil pump attachment seat 15j.

Next, description is given of operations of the embodiment of the present invention including the configuration described above.

Oil can be newly injected or supplied to the oil reservoir 20 by removing the bolt 22 from the side wall 15d of the torque converter case 15 of the transmission 13 to open the oil injection port 15f and inserting a nozzle of the oil injection gun 21 into the oil injection port 15f. The oil injection port 15f has a function of restricting an oil level, and a worker can know that the oil level of the oil in the oil reservoir 20 has reached a specified level when the injected oil overflows from the oil injection port 15f. In this case, if the oil to be discharged from the oil injection gun 21 splashes back from the inner wall 15k of the transmission and blows back out from the oil injection port 15f, the injection work of the oil is greatly hindered. In addition, there may be a case where the worker erroneously recognizes that the oil level of the oil in the oil reservoir 20 has reached the specified level, and an amount of the oil in the oil reservoir 20 is insufficient.

However, in the embodiment, the inclined surface 15m inclined such that a portion thereof farther away from the oil injection port 15f becomes lower is formed in the inner wall 15k of the oil reservoir 20 which faces a tip end of the nozzle of the oil injection gun 21 to be inserted into the oil injection port 15f, and guides the oil, which is to be discharged by the oil injection gun 21, toward the bottom portion of the oil reservoir 20. Accordingly, the oil to be discharged by the oil injection gun 21 is prevented from splashing back from the inner wall 15k of the oil reservoir 20 and blowing back out from the oil injection port 15f in a simple structure, and smooth oil injection work is thereby made possible. In addition, it is possible to prevent a situation where the worker erroneously recognizes that the injection work of the oil is completed, and the amount of the injected oil is insufficient.

Moreover, the oil to be injected from the oil injection gun 21 circulates as shown by an arrow A of FIG. 2 inside the oil reservoir 20 and may climb up the side wall 15d from below and blow back out from the oil injection port 15f. However, the protruding portion 150 protruding from the side wall 15d blocks the oil climbing up the side wall 15d, and the blowing-back of the oil from the oil injection port 15f can be thereby more surely prevented.

Furthermore, in a process of injecting the oil into the oil reservoir 20, if the oil level stably rises without fluctuating, timing to complete the injection work of the oil can be accurately recognized. In the embodiment, the oil pump 24 fastened to the oil pump attachment seat 15j of the torque converter case 15 by the bolts 25 protrudes out in an upper portion of the oil reservoir 20, and the oil pump 24 partially immersed in the oil exhibits a function of a baffle plate. This allows the oil level to stably rise in the process of oil injection.

Moreover, if the partition wall 15c of the torque converter case 15 on which the oil pump attachment seat 15j is formed is flat, support stiffness of the oil pump 24 is reduced due to a membrane surface vibration of the partition wall 15c, and this may cause vibrations and noises. However, in the embodiment, the inclined surface 15m is provided on a lateral side of the oil pump attachment seat 15j to be continuous therewith and the recess portion 15n greatly depressed in the axial direction is provided below the oil pump attachment seat 15j to be continuous therewith. Accordingly, the oil pump attachment seat 15j is reinforced by the inclined surface 15m and the recess portion 15n. Hence, the support stiffness of the oil pump 24 is improved and generation of vibrations and noises is effectively prevented.

Furthermore, since the outer periphery of the oil pump driven gear 27 located at a position lower than the oil level is surrounded by the oil pump attachment seat 15j, the oil in the oil reservoir 20 is prevented from being agitated with rotation of the oil pump driven gear 27. This can reduce agitation resistance of the oil and stabilize the oil level.

Although the embodiment of the present invention has been described above, various design changes can be made in the present invention within a scope not departing from the gist of the present invention.

For example, although the oil injection port 15f is provided in the torque converter case 15 of the transmission 13 in the embodiment, the oil injection port 15f can be provided in any portion of the transmission 13.

What is claimed is:

1. A transmission device, comprising:

a case comprising a side wall, an inner wall and a bottom wall;

an oil reservoir formed in a bottom portion of the case; and an oil injection port formed in a portion of the side wall located above the oil reservoir, wherein the oil injection port is configured to accommodate an oil injection gun, the oil injection gun is capable of injecting oil into the oil reservoir, the oil reservoir is defined by the inner wall and the bottom wall of the case, the inner wall faces a tip end of the oil injection gun when the oil injection gun is inserted into the oil injection port, the inner wall is integrally formed with an inclined surface, the inclined surface is inclined to become lower as it extends away from the oil injection port, such that the oil to be discharged by the oil injection gun is guided by the inclined surface toward a bottom portion of the oil reservoir, the inclined surface is formed so as to protrude from the inner wall and an upper portion of the inclined surface is connected to the side wall at a position upward of the oil injection port, a protruding portion is formed in the side wall below the oil injection port so as to protrude in a direction along which the oil injection gun is inserted into the oil injection port, and wherein the protruding portion blocks upward flow of oil to prevent blowing-back of the oil through the oil injection port.

2. The transmission device according to claim 1, wherein an oil pump is disposed at a position which is farther away from the oil injection port than the inner wall, and at least part of the oil pump is immersed in the oil when the oil is stored in the oil reservoir.

3. The transmission device according to claim 1, wherein an oil pump is disposed at a position which is farther away from the oil injection port than the inner wall, and at least part of the oil pump is immersed in the oil when the oil is stored in the oil reservoir.

4. The transmission device according to claim 1, wherein the case is formed with an attachment seat for an oil pump and the inclined surface is formed continuously with the attachment seat.

* * * * *